United States Patent
Lau

(10) Patent No.: US 6,350,046 B1
(45) Date of Patent: Feb. 26, 2002

(54) LIGHT FIXTURE

(76) Inventor: Kenneth Lau, 4327 Point Reyes Ct., Carlsbad, CA (US) 92008

( * ) Notice: Subject to any disclaimer, the term of this patent is extended or adjusted under 35 U.S.C. 154(b) by 0 days.

(21) Appl. No.: 09/358,979

(22) Filed: Jul. 22, 1999

(51) Int. Cl.⁷ .................................................. F21S 1/06
(52) U.S. Cl. ........................ 362/364; 362/147; 362/373; 362/294
(58) Field of Search ................................ 362/147, 260, 362/294, 364, 373, 365, 216

(56) References Cited

U.S. PATENT DOCUMENTS

| | | | | | |
|---|---|---|---|---|---|
| 4,497,016 A | * | 1/1985 | Sachse | ........................ | 362/294 |
| 4,520,436 A | * | 5/1985 | McNair et al. | ............. | 362/147 |
| 5,313,379 A | * | 5/1994 | Lemons et al. | ............. | 362/298 |
| 5,584,575 A | * | 12/1996 | Fickel | ........................ | 362/147 |
| 5,662,407 A | * | 9/1997 | Fischer et al. | .............. | 362/147 |
| 5,836,678 A | * | 11/1998 | Wright et al. | ................ | 362/364 |
| 5,927,843 A | * | 7/1999 | Haugaard et al. | ........... | 362/147 |
| 6,042,251 A | * | 3/2000 | McCarthy et al. | .......... | 362/147 |
| 6,095,671 A | * | 8/2000 | Hutain | ........................ | 362/264 |

* cited by examiner

Primary Examiner—Sandra O'Shea
Assistant Examiner—Peggy A Neils
(74) Attorney, Agent, or Firm—Charles C. Logan II

(57) ABSTRACT

A lighting system is designed to replace incandescent lighting by alternatively adapting existing recessed incandescent fixtures to accept more efficient lamps such as fluorescents, or using specially designed recessed lamp fixtures. In either case the invention addresses the problem of overheating of the on-board power stabilizing circuitry which almost universally occurs when an enclosed fixture designed for incandescent lamps is fitted with fluorescent replacements. Rather than installing the power stabilizer in the enclosure with the hot lamp, the power stabilizing circuitry is physically removed from the interior of the lamp housing and isolated at a remote position. The preferred embodiments house these electronics in a separate insulated ballast housing.

19 Claims, 7 Drawing Sheets

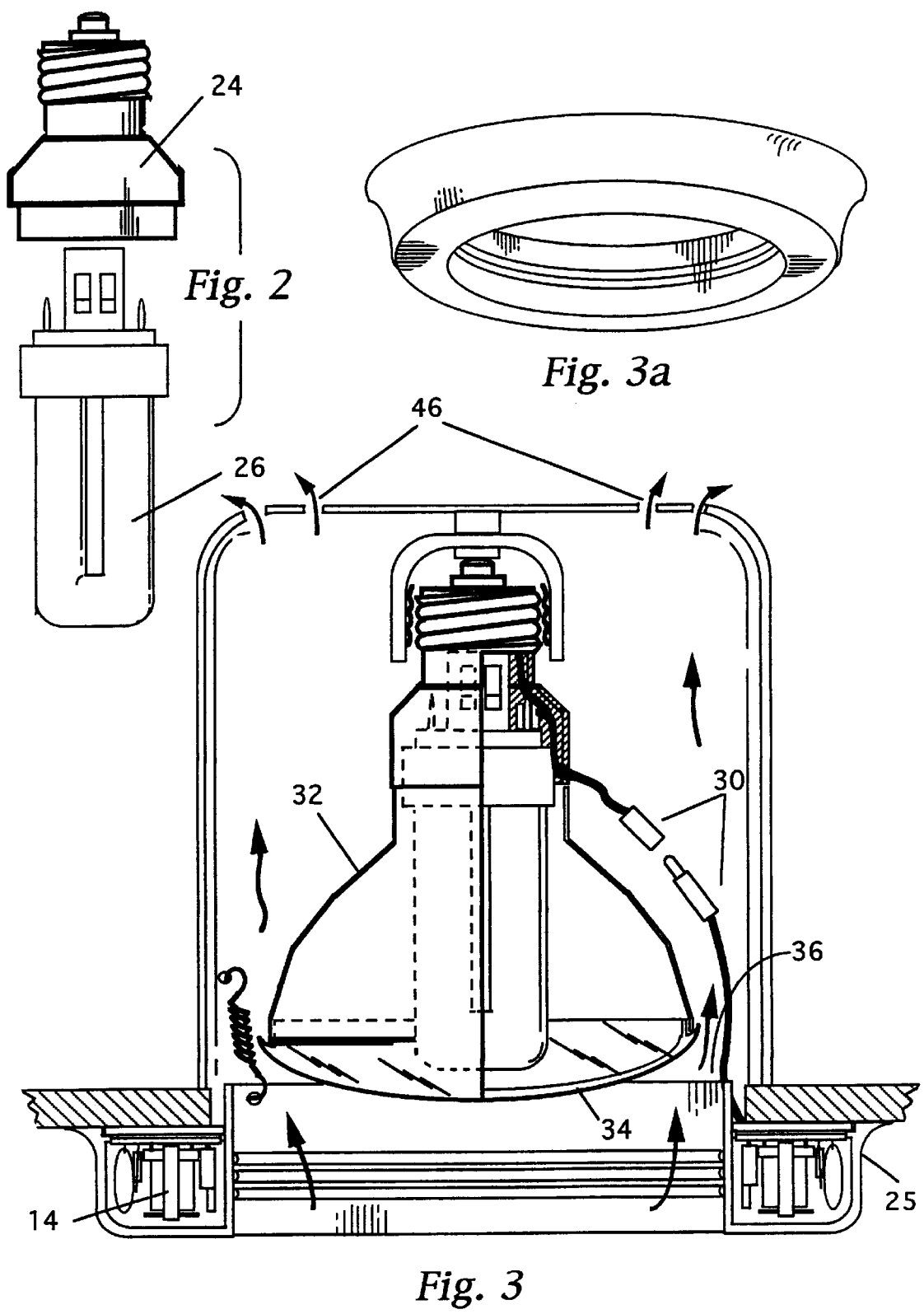

LIGHT FIXTURE

TECHNICAL FIELD

The invention is primarily designed for use with one or more fluorescent lamps because of their widespread popularity, but accommodates any type of lamp which requires an auxiliary power stabilizing circuit.

BACKGROUND ART

In addition to fluorescents, commonly used alternative lighting of this type includes low voltage halogen lamps, and high intensity discharge (HID) lamps, both of which are more compact and efficient than incandescents. All of these lamps require a circuit device to condition the power, as they will not operate on the U.S. standard, 110 volts at 60 Hz. current. In this specification, the lamps will be described as "fluorescent", and the power stabilizing circuit as the "ballast", but it will be understood that the term "fluorescent" refers generically to any lamp which requires an on-board (or auxiliary) device or circuit to stabilize the current or the voltage, or both, and such circuit or device is covered by the term "ballast". The ballast converts the local power, whether it be AC, DC, 110-Volt, 277-Volt or whatever, to the form for which the lamp and system were designed, so the same lamp is used everywhere, with the electronics being the adaptive factor.

With the advantage of more efficiency, these lamps come with the baggage of the auxiliary circuit requirement, and an inherent circuit overheating problem. Heat damage will result from continued exposure to the hot cathodes of the lamp, especially if the circuit is enclosed in the same housing as the lamp. Although the subject lamps are more efficient than incandescents by a factor of up to eight or ten to one, nonetheless up to 75% of the energy they consume is dissipated as heat. And whereas manufacturers recommend that the ambient temperature be no higher than 40 degrees centigrade, and never greater than 50 degrees, studies have shown that in a recessed ceiling can, temperatures around the upper area where the ballast would be, routinely exceed 70 degrees centigrade in a 25-degree room using a 27-watt fluorescent. Higher wattage mean commensurately higher temperatures. In that temperature range, circuit life is halved for every 10 degree-rise in temperature due to cumulative heat-induced insulation deterioration.

This disclosure specifically addresses ceiling-mounted fixtures, including "cans" recessed behind the ceiling panels. Retrofitting these cans to accept fluorescent lighting, or other lighting which is more efficient than incandescent, presents several problems. For one thing, the compact fluorescent lamps and adapters which are designed to replace light bulbs are generally too long to fit within the can and extend out slightly beyond the housing in ceiling-mount installations with vertical lamps. The can's translucent diffusion covers may have to be removed, resulting in the creation of both glare and aesthetic problems, which present obstacles to upgrading hotel corridors, lobbies and rooms and other large commercial establishments whose multiplicity of can installations cry for conversion to low-energy lighting.

If the ceiling can is a side-mount version designed to use a horizontally extended incandescent bulb, the typical compact fluorescent adaptor and lamp designed for retrofitting will not fit at all, since the tube does not have the option of extending beyond the boundary of the can. There are cans designed specifically for housing fluorescent replacements, but making these installations as retrofit conversions is very labor intensive and expensive. Worse, when finished the ballasts are still at the hot end of the can, still subject to premature failure from continuous exposure to heat not only from the lamp but from hot pipes and other equipment that is found between the ceiling joists. Upgrading often cannot be economically justified by lower utility bills, even without considering the reduced lamp and ballast life expectancy.

Much of the heat problem is caused by the practice of using standard compact fluorescent adapters which have the ballast around the base. Heat is also generated by the ballast itself, although this heat is dwarfed by the heat output of the lamp. These base-mounted units work fine for floor and ceiling lamps where there is adequate ventilation and the lamp base housing the electronics is below, not above, the hot lamp. But an inverted can, even though provided with ventilation holes, accumulates heat to destructive levels. This problem is aggravated by the fact that electronic ballasts, which replace the older coiled wire transformer-type ballasts, are much more sensitive to heat than traditional ballasts. The newer design has advantages in efficiency, reduced volume and weight, and inherent packaging versatility stemming from the ability to separate the components into different areas of the mounting fixture for compactness. These advantages lead to the use of electronic ballasts in applications for which they are not suited.

It is probably relatively rare for a construction salesperson to advise the building owner, responsible for authorizing an upgrade, of these problems, which skewer the economic balance even more against replacement.

Due to these problems, although hotels and other commercial establishments are slowly converting to reduced power consumption lighting, still only a small fraction of the possible conversions are actually being made. With a clear cost disadvantage of upgrading in some installations, it is difficult for the establishment to justify to the shareholders the changeover as part of its duty as a world citizen. There is a need for a simple retrofit unit which will enable can-mounted lighting to take full advantage of the economics of fluorescent tubes by preventing premature burn-out of electronic ballasts. There is also a need for newly designed recessed light fixtures that use fluorescent bulbs and/or require a power stabilizing circuit such as a ballast.

DISCLOSURE OF INVENTION

The instant invention fulfills the above-stated need by providing specially designed recessed lamp fixtures which come in several variations, but in all instances having a ballast compartment housed separately from the lamp housing. In addition to separation of the ballast from the lamp housing, several other design features keep the ballast cool. In one embodiment the passageway between the ballast and the lamp is preferably home to a moving air curtain which continuously draws up cool air alongside the ballast, driven by lamp-induced heat convection. In this embodiment the ballast is beneath the lamp if practicable, therefore it is substantially upwind from the hot airflow generated by the electrodes or filament, rather than immersed in it immediately above the hottest part of the lamp, as is traditional. Cooling air passes up around the ballast first, before it reaches the lamp, and then into the can, accumulating in the upper part where it dissipates by conduction, radiation and convection through ventilation holes.

One recessed can design has a ballast compartment which is separated from the rest of the fixture and is mounted in an annular ring flush against the bottom surface of the ceiling around the lamp opening. This rim-mounted circuit connects to the fluorescent base mounting socket, diverting incoming power from the power company and delivering it to the lamp in useable form. This version embodies the essential features of the invention wherein the ballast is separate from, and in fact does not even share a compartment with, the lamp, and a corridor for an air curtain is established between ballast and lamp.

Other forms of recessed lamp fixtures specifically designed for use with electronic ballast lamps have a separate ballast housing made of heat insulating material and whose only opening is in its bottom wall. The ballast housing is located remotely from the interior of the light source housing and/or a reflector housing. A heat sink structure is mounted in the bottom opening of the ballast housing to draw heat away from the power stabilizing circuitry. The heat sink structure may take the form of a cosmetic trim cover member.

BRIEF DESCRIPTION OF THE DRAWINGS

FIG. 2 illustrates an adapter socket exploded from a fluorescent tube designed for use in replacing incandescent bulbs;

FIG. 3 is a side elevation view, partly in section, of a complete ceiling can mount as it would appear substantially in-place using a ballast compartment which is separate from the socket mount and connected thereto with wiring;

FIG. 3a is an isometric view of the ballast housing ring of the fixture illustrated in FIG. 3, shown in isolation from the remaining structure of the fixture;

BEST MODE FOR CARRYING OUT THE INVENTION

The fixture of the invention comes in two basic styles: the ceiling can retrofit, and the newly designed recessed lamp fixture models. The can retrofit design is provided with a separate ballast compartment and lamp mounting socket. All of the models remove the ballast from the lamp housing and one model creates a circulating air space between the ballast and lamp housing. In a primary implementation of the inventive concept the ballast is configured as an annular rim around the lamp face, in which the ballast housing serves as a reflective and decorative element as well as being safely positioned beneath and removed from the hot lamp. This ring need not be round, as there are square cans as well as round ones and a few other polygonal shapes. Because the ballast is protected as a result of the invention, all lamps used in the disclosed fixtures would be of the type which do not integrate the ballast as disposable structure with the tube.

Figure 1:
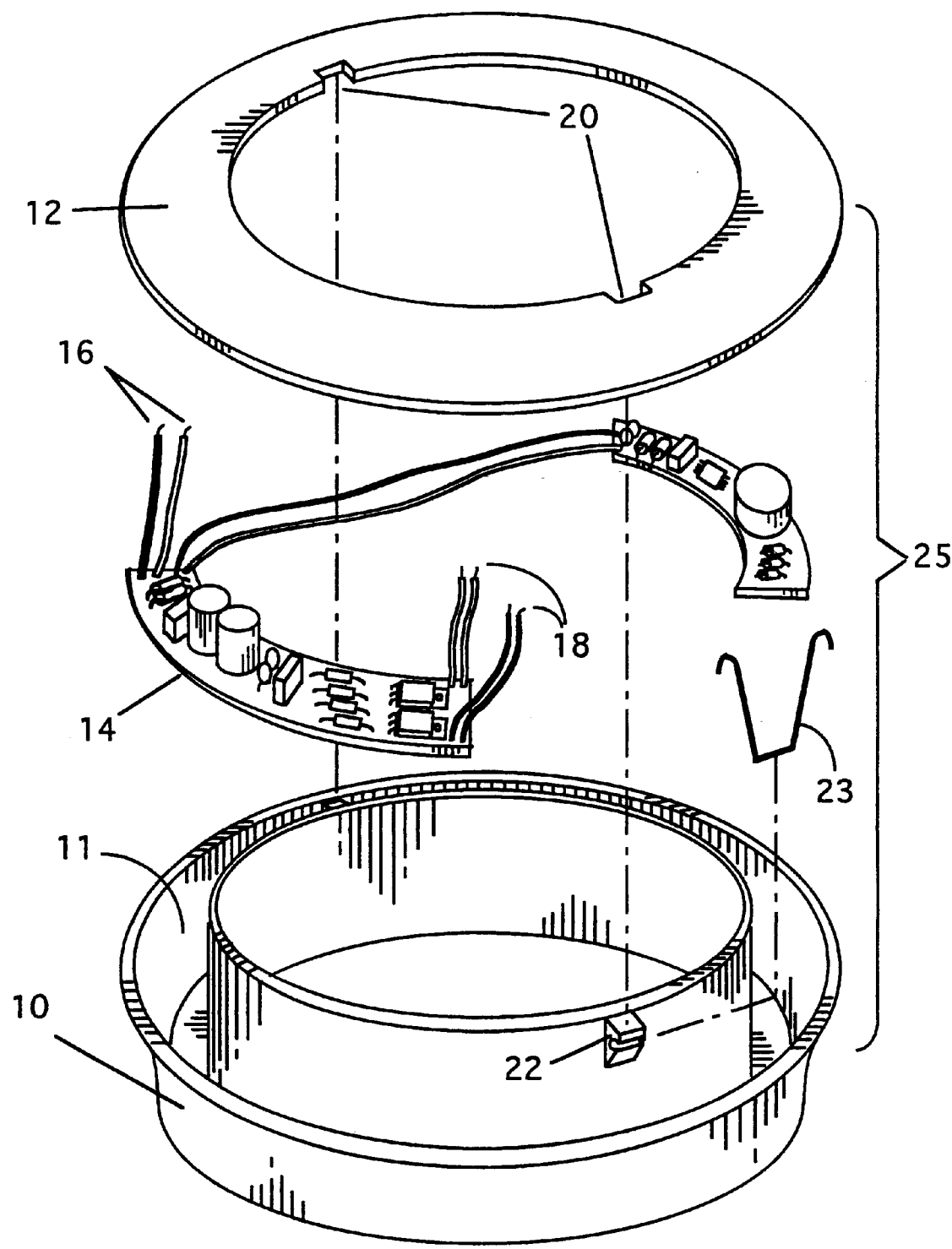
FIG. 1 illustrates a compartment containing the ballast or other power stabilizing circuitry, with the annular cover exploded.

The ballast-mounting compartment is shown in isolation in FIG. 1 for a typical can mount of the two-piece configuration in which the ballast and lamp socket are separate. The compartment 10 is formed by an annular trough 11, which together with the annular cover plate 12, encloses the ballast or other signal processing device forming the circuitry 14 which connects to the incoming power supply with conductors 16 and outputs a processed power signal ready for use by the lamp through the wires 18. The cover plate 12 has notches 20 to accommodate the clips 22 which are used to engage the wire bales 23 in the typical ceiling mount can design. The unit of FIG. 1 can be coupled through an existing incandescent socket or connected directly to house current power wires. Power processing is accomplished completely by the ballast in the annular compartment, and the lamp socket as shown in FIG. 2 at 24 is a mechanical mount which physically accommodates the pin structure of the fluorescent lamp with an existing incandescent lamp socket. It also houses the internal wiring, not shown, which diverts power from the mounting socket in the can to the processing circuitry 14. The annular ballast compartments 10 and 25 of FIGS. 1 and 3, respectively, are representative of any of the compartments for any of the configurations having an annular ballast rim.

FIG. 2 illustrates a typical replacement fluorescent lamp 26 shown exploded from the fluorescent lamp mounting socket 24. This type of socket is too small to house the ballast as shown and is the second piece of the two-piece system of FIG. 3 in which the other piece is the ballast compartment rim 25 which is similar to the annular compartment of FIG. 1 which is frontally mounted on the ceiling. FIG. 3 also illustrates a replacement tube having a reflector 32, representative of a commercially available line of lamps. A cover 34 over the face of the lamp spans the interspace internally of the annular compartment 25. Note that the reflector 32 and the cover 34 together resemble a flood light, and the extended can length effected by the use of the ballast housing 25 enables the fluorescent replacement to be used without extending beyond the can structure.

In the FIG. 3 embodiment, an air passageway 36 can be seen between the reflector 32 and the ballast compartment 25. This passageway is substantially continuous, and is vertical and wide enough that air freely flows up into the can 37 and out ventilating holes in the top of the can. Even though the flow is relatively slow, because the ballast rim is disposed below the lamp, it is not exposed to accumulated heat as it would be were it internal of the can, so that the effects of the thermally-aware positioning and the cool airflow are adequate to prevent overheating of the ballast, which would not be much hotter than ambient air temperature.

It can be appreciated from FIG. 3 that the ballast housing 25 does much more than just hide the ballast. The cylindrical inside wall of the housing defines a continuation of the flood reflector 32 and itself acts as a light-channelling reflector. It also has the effect of extending the overall length of the can so that the most exposed part of the lamp is still adequately recessed and it will not glare out the side, nor be visible to the eye from across the room. This advantage is applicable to all of the lamp variations that are substantially elongated, such as the fluorescent lamp 26 of FIG. 2, although with the electronics being separated from the base of the lamp unit its overall length is reduced and is not the problem that it would be otherwise. Higher wattage lamps however come in longer sizes, and the cooling characteristics of the inventive improvements set forth herein make practical the use of longer lamps with higher wattage ratings.

As noted, although fluorescents and the other efficient lamps produce more light than incandescents per unit of consumed power, they still dissipate the major portion of their energy as heat. The heat problem encountered when replacing incandescents with fluorescents in enclosures generally goes unmentioned to the purchaser making the upgrade decision. No doubt in many instances a building owner, looking forward to the money saved in electrical bills, is shocked to find that the replacement cost of the ballasts and fluorescent lamps more than erodes any savings he might have achieved from economy of energy consumption. And the non-commercial consumer, such as the homeowner or small apartment landlord, is lucky to have any technical support at all.

Figure 4:
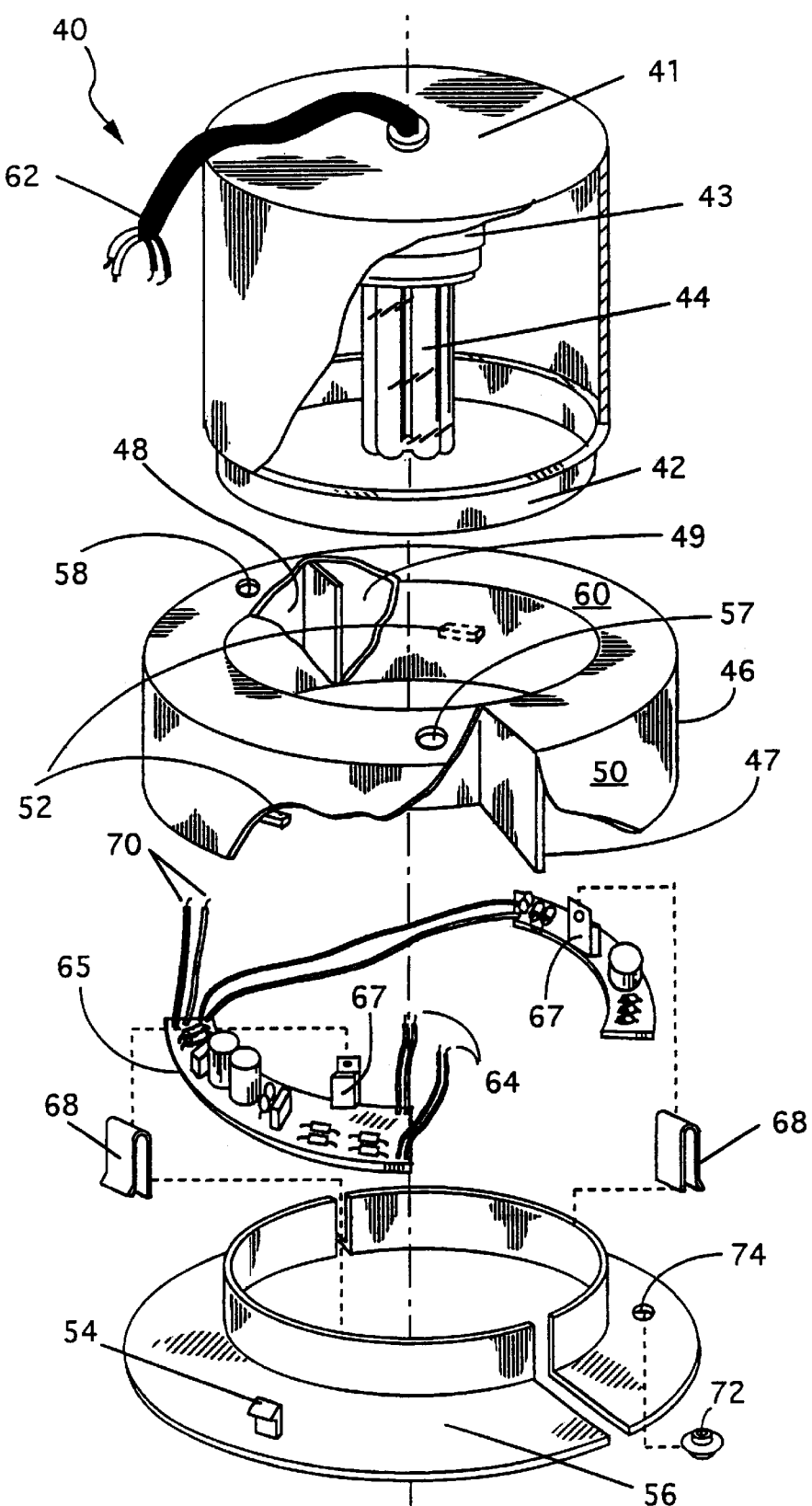
FIG. 4 is an exploded isometric view of a first alternative embodiment of a recessed lamp fixture with portions broken away for clarity.
Figure 5:
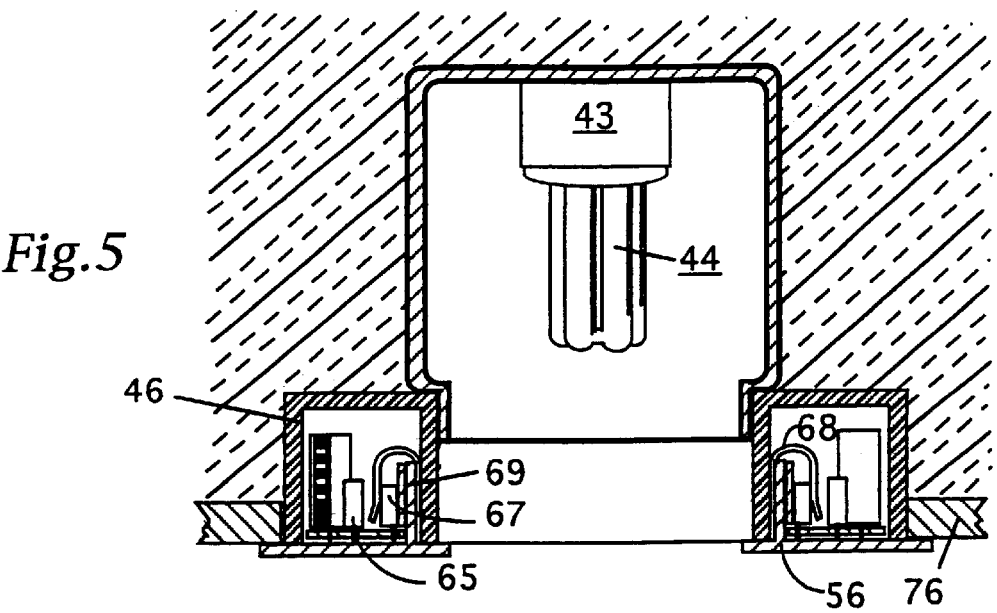
FIG. 5 is a side elevation view of the first alternative embodiment showing it mounting in a ceiling filled with insulation.
Figure 6:
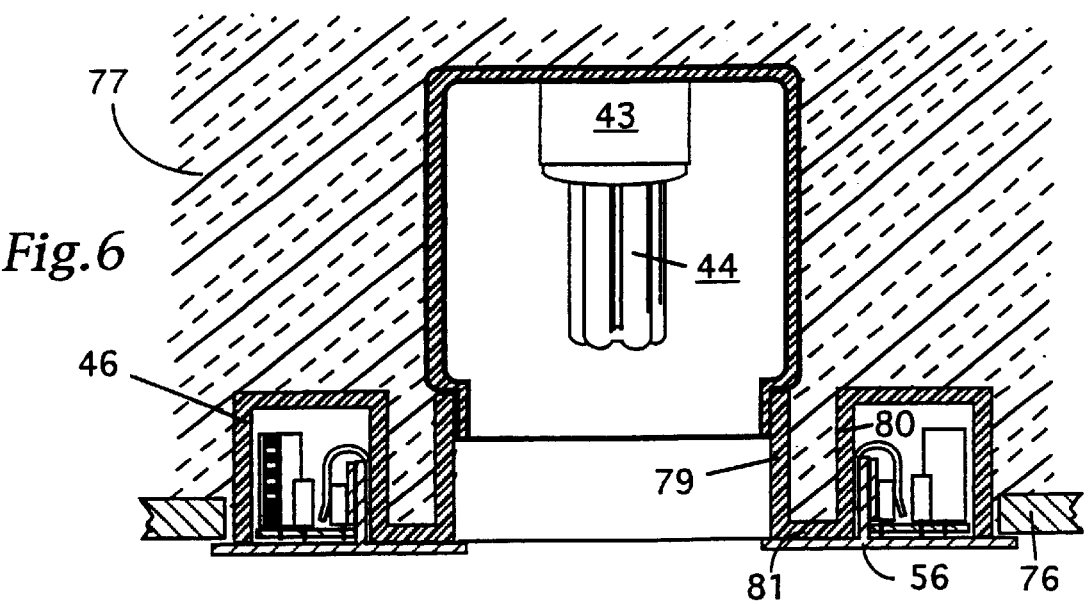
FIG. 6 is a side elevation view of the first alternative embodiment showing it with a differently configured ballast housing.

The first alternative embodiment of a newly designed lamp fixture is illustrated in FIGS. 4–6. It is generally designated numeral 40. It has a light source housing 41 having a generally cylindrical shape. The bottom end of light source housing 41 has a reduced diameter to form an annular lip 42. Enclosed within the light source housing is a socket 43 and lamp 44. Annular lip 42 is secured to the interior of annular ballast housing 46 by a friction fit or by use of conventional mechanical fasteners. Ballast housing 46 is hollow and has its bottom end open. It may be formed as a single chamber or it may have a pair of wall partitions 47 that divide it into chambers 48 and 49. Ballast housing 46 has an outer annular wall 50 and internal retainer protrusions 52 on its inner surface mate with clips 54 extending upwardly from the top surface of heat sink trim 56. Apertures 57 and 58 are formed in top wall 60 of ballast housing 46. Wires 62 have their one end connected to socket 43 and pass through aperture 57 and are connected to ballast wires 64. Ballast 65 is formed of a PC board with its electrical components mounted thereon. A pair of fingers 67 extend upwardly from the top surface of the PC board of ballast 65. Clips 68 attach the fingers 67 to annular wall 69 that extends upwardly from the inner edge of heat sink trim 56 for securing these two members together. Power output wires 70 pass through aperture 58 and are connected to ballast 65. As an option, a sensor such as a photo-cell 72 may be attached to the PC board and be mounted in aperture 74.

FIG. 5 shows recessed lamp fixture 40 mounted in a ceiling 76 filled with insulation 77. A differently configured ballast housing 46 is illustrated in FIG. 6. It has annular spaced vertical walls 79 and 80 that are connected at their bottom end by an annular disc portion 81. This structure requires a different heat sink trim 56' but otherwise the remainder of its structure is the same as that illustrated in FIG. 5.

Figure 7:
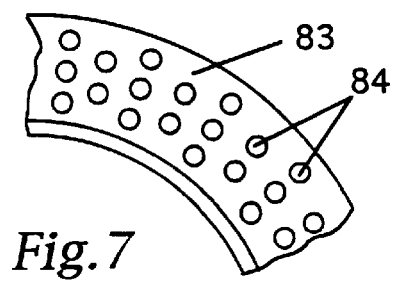
FIG. 7 is a partial top plan view of a first alternative heat sink trim.
Figure 8:
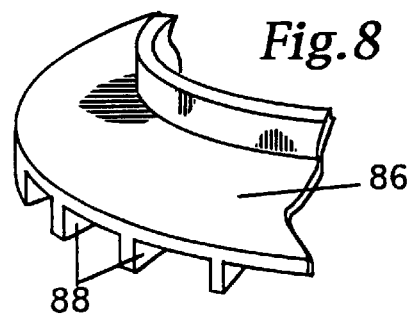
FIG. 8 is a partial isometric view of a second alternative heat sink trim.
Figure 9:
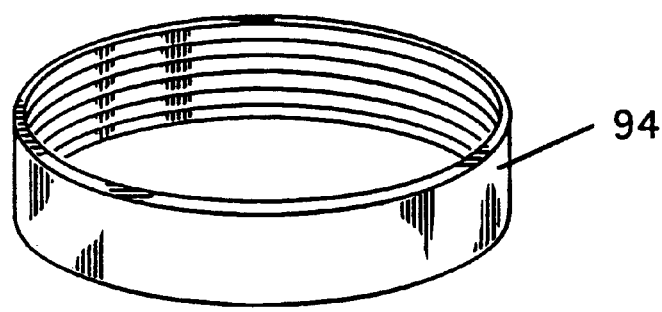
FIG. 9 is an isometric view of a baffle that can be used with the heat sink trim illustrated in FIG. 10.

FIG. 7 illustrates another heat sink trim 83 having apertures 84 in its horizontal surface for allowing additional cooling of the ballast electrical components. Another heat sink trim 86 is illustrated in FIG. 8 and it has a plurality of downwardly extending ridges or webs 88 that give additional surface area for cooling the heat sink trim.

Figure 10:
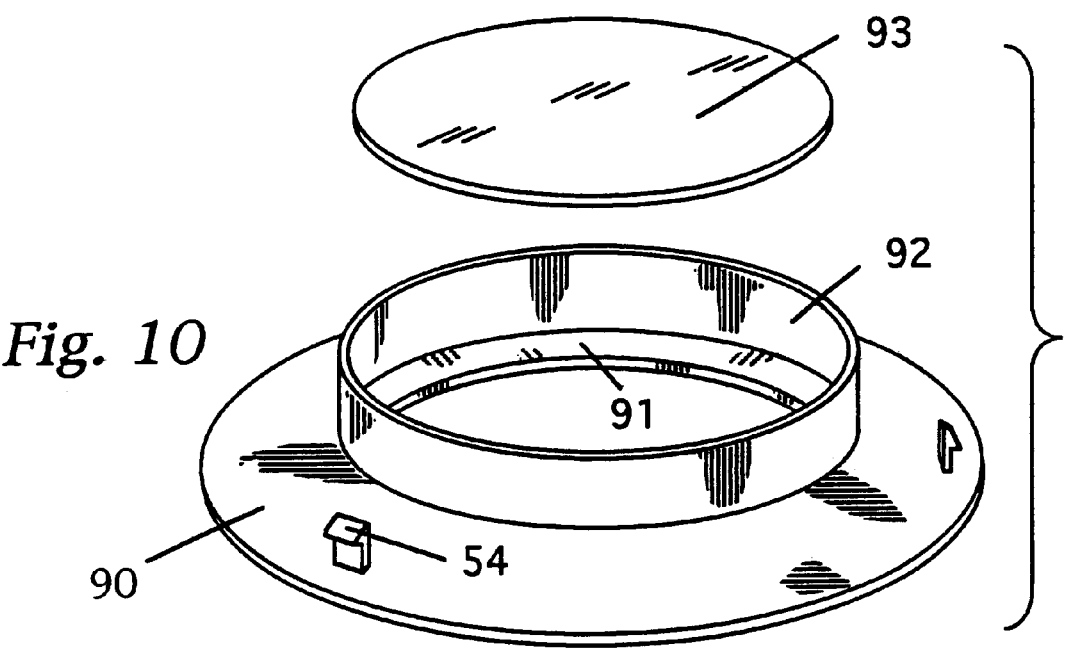
FIG. 10 is an exploded view of a third alternative heat sink trim that has a planar lens.
Figure 11:
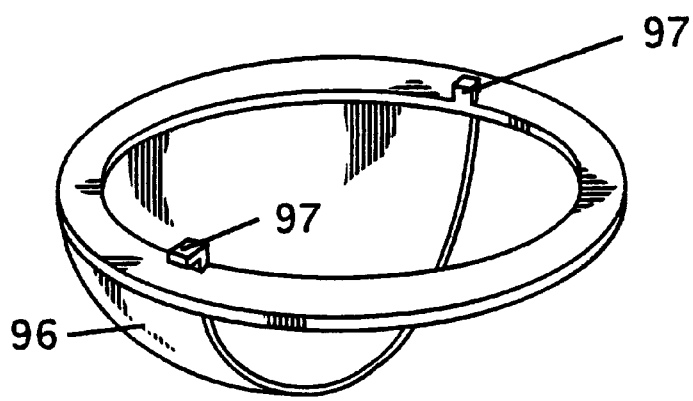
FIG. 11 is an isometric view of a fourth alternative heat sink trim that has a globe shaped lens.
Figure 12:
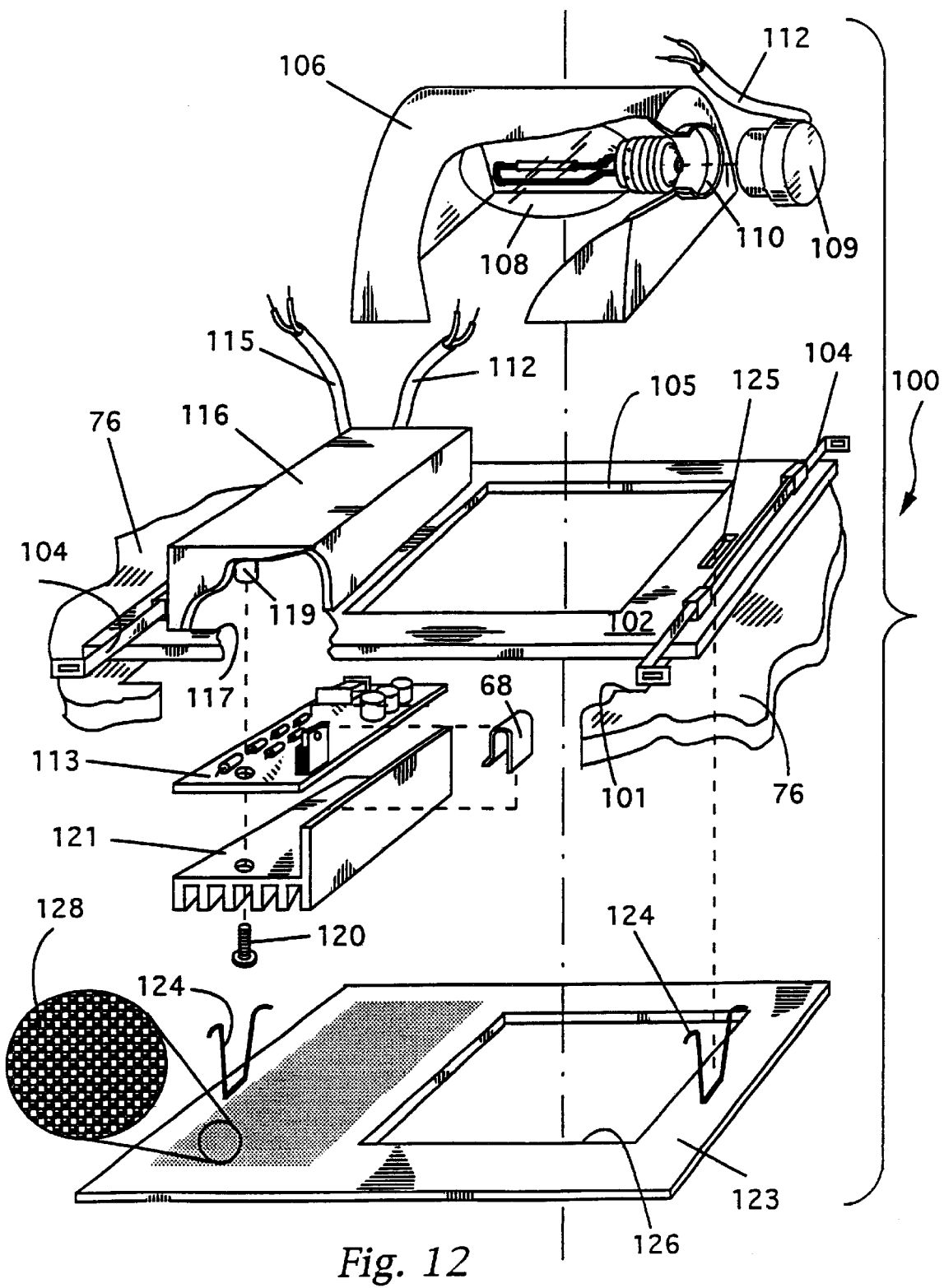
FIG. 12 is an exploded isometric view of a second alternative embodiment of a recessed lamp fixture.

FIG. 10 illustrates another heat sink trim 90 having an inwardly extending annular flange 91 inside its vertical wall 92. A lens 93 may be supported thereon and/or a baffle 94 may be supported thereon. FIG. 11 shows a globe shield 96 having fingers 97 for supporting it from inner annular flange 91.

Recessed lamp fixture 100 is an alternative embodiment that would be mounted above an aperture 101 in ceiling 76. It has a horizontal panel 102 that extends across the diameter of the opening. Both the aperture and the panel may have any desired shape or configuration. A pair of mounting rails 104 are secured to the top surface of panel 102 that is made of heat insulating material. The opposite ends of mounting rails 104 may be secured to wooden joist (not shown) that form the framework for ceiling panel 76. Aperture 105 is configured to mate with the outer shape of metal reflector 106. These two structures may be round, rectangular or any other desired shape. A lamp 108 of the discharge type that needs a ballast is threadably received in socket 109 and collar 110 of metal reflector 106 telescopes over the outer surface of socket 109 to form a friction fit. Wires 112 connect between socket 109 and ballast 113. Wires 115 connect ballast 113 to a source of electrical power. Ballast housing 116 is made of heat insulating material and it may be integrally formed with panel 102. Its bottom wall is open to form an aperture 117. Extending down from the interior of ballast housing 116 may be one or more mounting posts 119 for receiving screws 120 that secure heat sink 121 thereto. Ballast 113 is mounted on heat sink 121 and they are secured together by clips 68 in the same manner as illustrated in FIG. 4. Since the only opening in ballast housing 116 is the aperture 117 formed by lack of a bottom wall, all of the heat created by the electrical components of ballast 113 can only escape in a downward direction. Heat dissipation is measurably aided by heat sink 121. A trim panel 123 would be mounted to the underside of ceiling 76 and supported thereto by wire bales 124 that pass upwardly through slots 125 in mounting panel 102. Aperture 126 would normally be configured to mate aperture 105. Trim panel 123 may have a pattern of perforations 128 immediately below heat sink 121 to enhance transfer of heat from ballast 113 and its electrical components.

Figure 13:
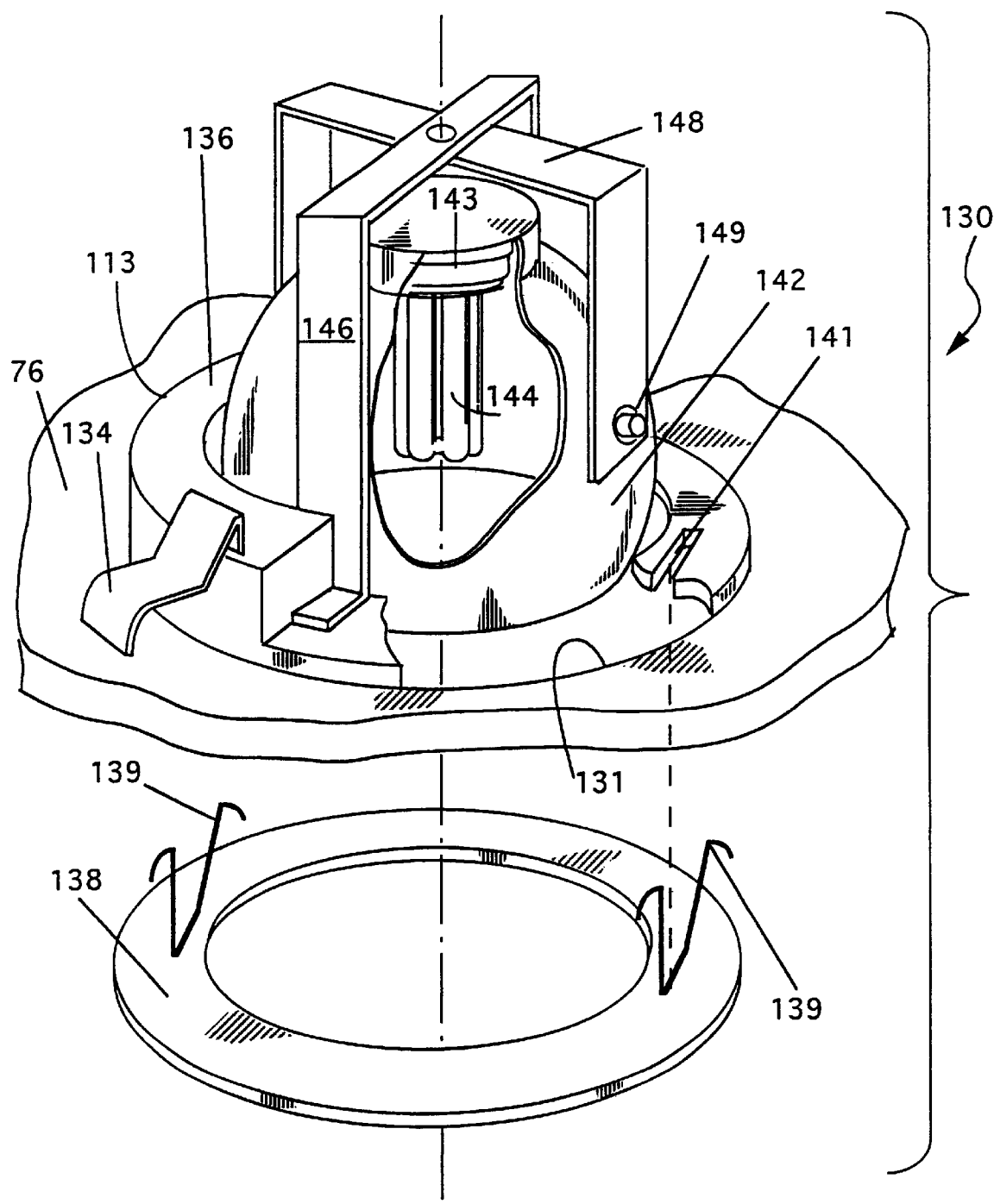
FIG. 13 is an exploded isometric view of third alternative embodiment of a recessed lamp fixture.

A third alternative recessed lamp fixture 130 is illustrated in FIG. 13. It is mounted above an aperture 131 in ceiling 76. Ballast housing 133 has a pair of diametrically opposed mounting springs 134 whose top ends are rigidly secured in top wall 136 of ballast housing 133. The entire unit is installed by pushing it upwardly through aperture 131 and once there above, the bottom ends of springs 134 expand outwardly and prevent its dropping downwardly through aperture 131. Trim member 138 has a pair of wire bales 139 secured to its top surface and they pass upwardly through slots 141 of ballast housing 133. Reflector 142 has a socket 143 mounted in its top end that receives a lamp 144. A bracket 146 secures reflector 142 and ballast housing 133 together. Bracket 148 is pivotally secured to bracket 146 thereby allowing reflector 142 to be rotated. Pivot pins 149 allow reflector 142 to be pivoted about a horizontal axis.

It is to be understood that most of the structure illustrated in the different Figures and embodiments can be utilized in every other embodiment where they are performing similar functions.

What is claimed is:

1. A recessed lamp fixture for mounting at least one lamp which requires a power stabilizer circuit to operate and defines a base, and which illuminates a target area through an opening in a ceiling panel through which passes a beam of light from said lamp therethrough, comprising:

a) at least one lamp mount device defining a socket connectable to an available electrical power source for physically receiving and electrically powering a base of said lamp when inserted in said socket;

b) said lamp when inserted into said socket having a top end and a bottom end;

c) a lamp housing having upright oriented side walls that surround said lamp; said lamp housing having a bottom end that is open to allow said beam of light from said lamp to exit said lamp housing; said bottom end of said lamp housing being located no higher than the bottom end of said lamp; said side walls having an inner surface and an outer surface;

d) a ballast housing having walls that define an enclosure having a bottom end;

e) a power stabilizer circuit device for processing available power, said circuit device being substantially comprised of components housed in said ballast housing and operatively interconnected between said socket and a power source to intercept and stabilize power from said power source and deliver power so stabilized and usable by said lamp to said socket;

f) means for supporting said ballast housing laterally positioned from said lamp housing so that it is not above said lamp housing in substantial thermal isolation from said lamp and said open bottom end of said lamp housing;

g) said lamp fixture is of the recessed type which mounts a lamp spaced behind a room surface and said opening is defined in said room surface; and h) means for supporting said lamp housing above said opening in said room surface.

2. A light fixture according to claim 1 wherein said inner surface of said lamp housing is reflective to act as a reflector for said beam.

3. A light fixture according to claim 1 wherein said means for closing the top end of said side walls of said lamp housing is a top wall having a bottom surface to which is secured said lamp mount device.

4. A light fixture according to claim 1 further comprising a metallic heat sink panel that substantially covers said opening in said ceiling panel for drawing heat away from said power stabilizer circuit device.

5. A light fixture according to claim 4 further comprising means for supporting said heat sink in its intended position.

6. A light fixture according to claim 1 wherein said ballast housing is mounted on a support panel having its own opening for transmitting light from said lamp that aligns with said opening in said ceiling panel; said support panel having a top surface.

7. A light fixture according to claim 6 wherein said support panel has a light transmission opening and a collar extends upwardly from said top surface of said support panel for receiving the bottom end of said lamp housing.

8. A light fixture according to claim 1 further comprising a plastic trim panel positioned below said opening in said ceiling panel and means for detachably securing said plastic trim panel in position; said trim panel having a plurality of apertures located beneath said bottom end of said ballast housing to help remove ballast heat.

9. A light fixture according to claim 1 wherein said ballast housing is substantially formed in the shape of an annular ring.

10. A light fixture according to claim 9 further comprising an annular shaped trim panel and means for securing it to said bottom end of said ballast housing.

11. A light fixture according to claim 10 wherein said trim panel is made of metal so that it functions as a heat sink for drawing heat away from said power stabilizer circuit device.

12. A light fixture according to claim 10 wherein said trim panel is made of plastic material and it has a plurality of apertures to help remove ballast heat.

13. A lamp fixture for mounting at least one lamp which requires a power stabilizer circuit to operate and defines a base, and which illuminates a target area through an opening which passes a beam of light from said lamp therethrough, comprising:

(a) a lamp mount device defining a socket connectable to an available electrical power source for physically receiving and electrically powering the base of said lamp when inserted in said socket;

(b) a ballast housing of planform dimension similar to the dimensions of said opening, for housing a power stabilizer circuit device;

(c) said power stabilizer circuit device for processing available power, said circuit device being substantially comprised of components housed in said ballast housing and operatively interconnected between said socket and power source to intercept and stabilize power from said power source and deliver power so stabilized and useable by said lamp to said socket; and (d) means for supporting said ballast housing, in substantial thermal isolation from said lamp, as a rim around said opening such that said ballast housing is substantially distanced from lamp-generated accumulated heat; and (e) said lamp fixture is of a recessed type which mounts said lamp spaced behind a room surface and said opening is defined in said surface and said ballast housing acts as a trim for said opening.

14. A light fixture according to claim 13 wherein said ballast housing defines a substantially cylindrical inwardly-directed inner surface generally paralleling said beam of light and said inner surface is reflective to act as a reflector for said beam of light.

15. A fixture according to claim 13 wherein said room surface comprises a ceiling and said lamp mount device is recessed in said ceiling and said ballast housing is substantially coplanar with said ceiling and defines a trim strip rimming said opening.

16. A fixture according to claim 15 wherein said ballast housing extends a substantial distance away from said ceiling and acts as an enclosed space extension to mask a substantial portion of a lamp mounted in said socket to reduce glare and barely have lamp visibility.

17. A fixture according to claim 13 wherein said lamp mount device and ballast housing comprise a retrofit conversion for an existing installed recessed ceiling can and they are separable units and said power stabilizer circuit device is interconnected with said socket by wires, and said means to support said ballast housing comprises wire clips to engage standard wire clip-engaging detents of said ceiling can.

18. A fixture according to claim 13 wherein said ballast housing includes at least one photo cell sensor integral therewith and interconnected with said power stabilizer circuit device at least to derive power therefrom and being exposed to the ambient environment.

19. A fixture according to claim 1 wherein said ballast housing includes at least one photo cell sensor integral therewith and interconnected with said power stabilizer circuit device at least to derive power therefrom and being exposed to the ambient environment.

* * * * *